United States Patent Office 3,849,539
Patented Nov. 19, 1974

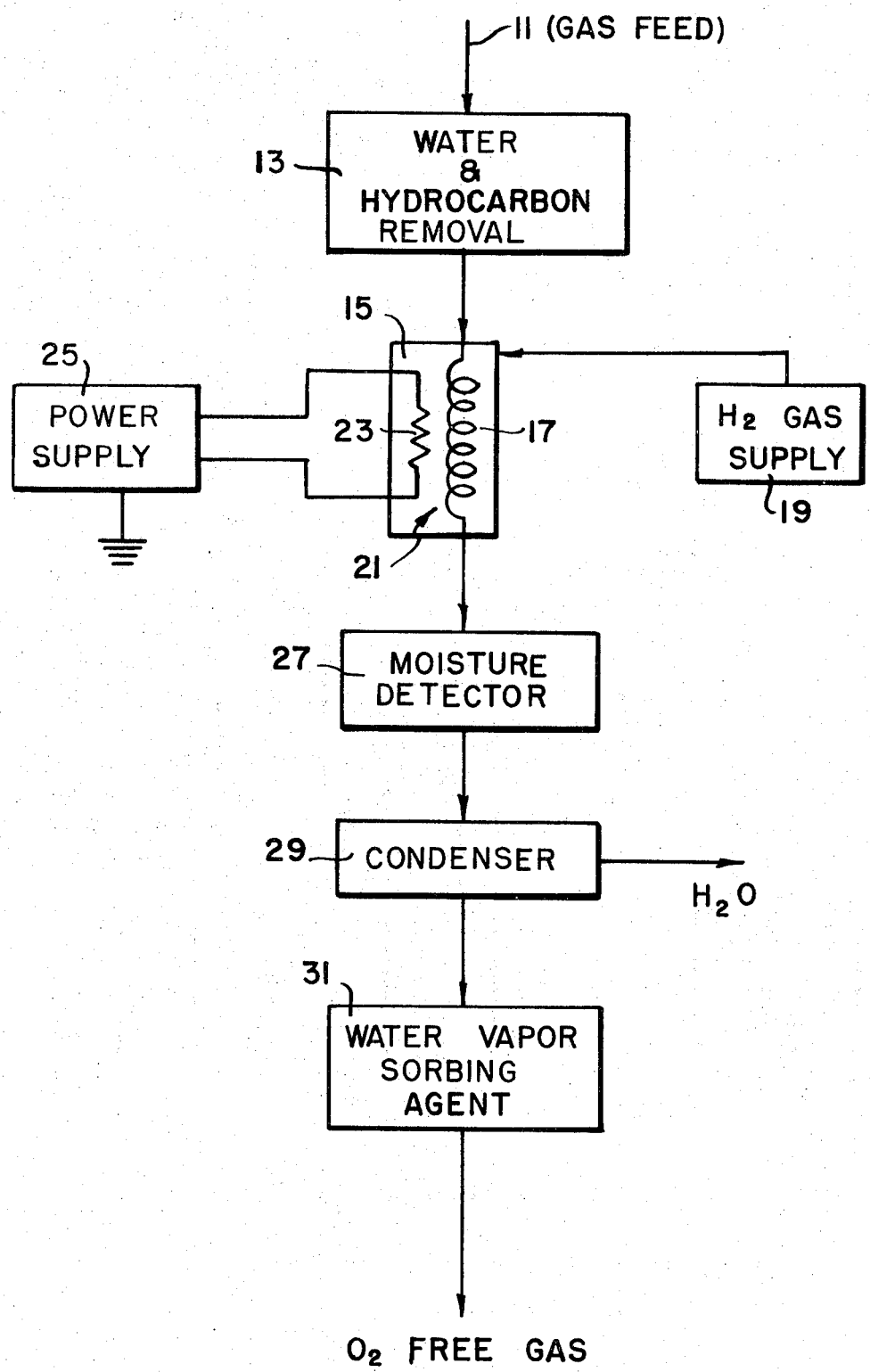

3,849,539
METHOD OF OXYGEN DETECTION AND REMOVAL
John H. Coleman, Roseville, Mich., assignor to the United States of America as represented by the United States Atomic Energy Commission
Filed Oct. 17, 1972, Ser. No. 298,201
Int. Cl. C01b 13/00
U.S. Cl. 423—219                    1 Claim

ABSTRACT OF THE DISCLOSURE

An oxygen bearing gas stream is dehumidified and separated from other hydrogenous gases prior to passing into contact with one surface of a heated palladium barrier. Hydrogen gas is maintained in contact with an opposite surface of the barrier at a sufficient pressure to significantly diffuse into the oxygen bearing gas stream. Substantially all of the oxygen reacts with hydrogen at the barrier surface to form water vapor. By detecting the quantity of water vapor produced, the original oxygen content of the gas can be determined. The gas is then dried by low temperature condensation and contact with a sorbent.

CONTRACTUAL ORIGIN OF THE INVENTION

The invention described herein was made in the course of, or under, a contract with the United States Atomic Energy Commission.

This development relates to a process for detecting and separating oxygen from a gas flow. It has particular applicability in providing gas supplies employed in glovebox technology and in other applications where oxidation of substances contained within a closed system is undesirable. Often inert gas such as nitrogen will become contaminated with low oxygen concentrations. The detection and removal of such contamination becomes especially important where delicate instruments or sensitive reactions are to be protected. The full gas flow or a sample fraction can be passed through the process and the oxygen content determined. Where oxygen free gas is required, the full gas flow can be deoxygenated within the process. Otherwise, only a gas sample need be monitored and it can be returned to the main flow after determining oxygen content.

DESCRIPTION OF THE PRIOR ART

There are a number of presently available devices for oxygen determination. Often the oxygen gas is absorbed in a liquid solution and the amount determined by a volumetric decrease or by a change in the electrical potential of a cell employing the liquid absorbent. These devices suffer from the various disadvantages such as possible liquid spill over into other components of the system or the inclusion of impurities. Where hydrogen or other combustible impurities enter other type systems, errors in oxygen content can result from their oxidation. Furthermore, these prior oxygen determination processes are not considered practical for removing substantial amounts of oxygen from a gas supply.

SUMMARY OF THE INVENTION

Therefore, it is an object of the present invention to provide a process for accurately determining the oxygen content of a gas stream having low oxygen concentration.

It is also an object to provide an oxygen determination process which facilitates production of an oxygen free gas.

It is likewise an object to provide an oxygen metering and removal system that will convert oxygen into a convenient compound for detection and removal.

In accordance with the present invention a flow of oxygen containing gas is dried and separated from included hydrogenous vapors. The gas is subsequently passed into contact with one surface of a hydrogen permeable barrier while the opposite side of the barrier is maintained in contact with hydrogen gas. Sufficient hydrogen diffuses through the barrier to form water vapor by combining with substantially all of the oxygen. The water vapor concentration is determined and the gas subsequently dried for process use.

DESCRIPTION OF THE DRAWING

The drawing is a diagrammatic representation of an oxygen metering and removal process.

DETAILED DESCRIPTION

Referring to the drawing, a feed gas stream 11 that may contain oxygen is illustrated to represent either a full gas flow or a sample diverted from the full flow. The gas is fed into a removal process illustrated at 13 where water vapor and hydrocarbons or other hydrogenous components are separated from the gas flow.

Although removal process 13 can be any of various means for extracting water vapor and other hydrogenous material from a gas flow, a molecular sieve bed of suitable sorbents are preferred to obtain sufficiently low concentrations of these constituents so as not to interfere with the subsequent oxygen determinations. Water vapor can be effectively removed down to a few hundredths millimeter of mercury partial pressure with several of the zeolites, that is the metal aluminosilicates, or with magnesium perchlorate. Somewhat less effective, but often satisfactory removal can be produced with activated alumina or silica gel. Similarly, these same sorbents along with others such as activated carbon can be employed for removal of hydrocarbons and other hydrogenous material. The required sorbents for a particular gas composition can be readily selected in accordance with the desired composition of the discharged gas flow. In this regard reference is made to Hersh, Molecular Sieves, Reinhold Publishing Corporation 1961.

After dehumidification and extraction of hydrogenous compounds, the gas stream is admitted into a chemical reactor 15 where hydrogenation of the free oxygen is performed. The reactor includes a conduit 17 shown as a coil to provide sufficient surface contact area. Conduit 17 serves as a hydrogen permeable barrier between the gas stream within the conduit and a surrounding enclosed volume 21. It will be understood that other forms of barriers such as diaphragms or partitions arranged to form channels can also be used.

A hydrogen gas supply 19 maintains a hydrogen atmosphere within the enclosed volume 21 surrounding conduit 17. The hydrogen atmosphere preferably consists of essentially pure hydrogen at a sufficient pressure to ensure ample diffusion through the conduit walls to react with substantially all of the oxygen. A heating element 23 shown connected to power supply 25 elevates the temperature of the conduit to further increase the hydrogen diffusion rate. Generally about 100° C. to 300° C. is a sufficient operating temperature. It will, of course, be clear that other heating devices can likewise be selected for this purpose.

As mentioned above, the barrier represented by conduit 17 is constructed of a hydrogen permeable material. Palladium metal is well suited for this application because it not only will permit sufficient hydrogen diffusion but will also catalyze the hydrogen-oxygen reaction within the conduit. Of course, other less suitable metals having lower hydrogen permeability, such as nickel, iron, or various alloys or cladding, might also be selected where extreme conditions rule out palladium use. However, a palladium or perhaps platinum surface should be exposed at the oxygen side of the barrier to catalyze the reaction. Where palladium is selected for use, its durability can be enhanced by alloying it with silver. A particularly suitable alloy composition comprises about 25% silver and 75% palladium.

As an example of the operation of reactor 15, a flow of nitrogen gas at about 3 atmospheres pressure absolute containing about 1% oxygen impurity is passed through conduit 17 which is heated to about 200° C. Hydrogen gas at about 6 atmosperes pressure absolute is maintained within volume 21. The hydrogen diffuses through the walls of the palladium-silver conduit 17 and combines with the oxygen impurity at the inner conduit surface to form water vapor within the nitrogen gas.

The humid gas is then allowed to pass into a moisture detector device, illustrated at 27, for determination of the amount of water vapor and accordingly, the amount of oxygen within the gas flow. Suitable moisture detectors that are commercially available employ a dew or frost point determination to reveal water content. A photoelectric device monitors a silvered mirror exposed to a continuous gas flow that is at a temperature slightly below the dew or frost point. A change in the moisture content of the gas will cause more (or less) condensation on the mirror and thereby correspondingly change the response of the photoelectric device. The gas temperature is automatically adjusted until it is again only slightly below the dew or frost point by measuring the degree of dispersion of the reflected light. Consequently, by monitoring the adjusted temperature of the gas flow near the mirror the condensation point can be closely followed. If the moisture content of the gas is thus found suitably low or otherwise acceptable, the gas stream may be directed to the intended use. Otherwise, the dehumidification steps described below will be required.

Dehumidification of a gas having substantial water vapor content is preferably performed by first condensing out a major portion of the water within a refrigerated condenser shown at 29. By cooling the gas to 1° C. just above the freezing point, the partial pressure of the water vapor is reduced to about 5 mm. Hg within the gas flow. In 3 atmospheres total absolute pressure, as suggested above, the gas flow will consist of only about 0.002 volumetric fraction water vapor.

If the cooled gas is not sufficiently dry, it then flows into contact with a water vapor sorbing agent shown at 31. A desiccate or sorbent such as magnesium perchlorate or a metal aluminosilicate, as suggested above, can be used in this application. Partial pressures down to 0.01 mm. Hg water vapor can be obtained through use of these sorbents.

It will be apparent that the present invention provides a process for accurately determining very low oxygen concentration within a gas flow. The process converts substantially all of the oxygen to water vapor and thereby facilitates its separation. It will also be understood that the invention is not limited to the specific arrangement shown or the details described but only by the scope of the appended claims.

The embodiments of the invention in which an exclusive property or privilege is claimed are defined as follows:

1. A method of determining and removing oxygen from a gas stream inert to hydrogen, wherein said oxygen concentration is less than 1% by weight, comprising:

passing said gas through a sorbent material selected from the group consisting of magnesium perchlorate and the metal aluminosilicates for drying said gas to a partial pressure of water vapor no more than a few hundredths of a millimeter of mercury;

passing said gas at about 3 atmospheres absolute pressure through a coil of tubing composed of a material comprising palladium;

contacting the outside surface of said coil of tubing with essentially pure hydrogen gas at about 6 atmospheres pressure and about 200° C. to diffuse a sufficient amount of hydrogen through the wall of said tubing to chemically combine with substantially all of said oxygen and form water vapor;

cooling said gas to and continuously monitoring the condensation-point temperature of water vapor in said gas in order to detect the moisture concentration resulting from said chemical combination of oxygen with hydrogen within said gas; and further cooling said gas to about 1° C. above the freezing point of water at about 3 atmospheres absolute pressure to condense a major portion of said water vapor therefrom and subsequently passing said gas into contact with a sorbent material selected from the group consisting of the metal aluminosilicates and magnesium perchlorate to remove substantially all of said water vapor and thereby produce a substantially oxygen free gas.

References Cited
UNITED STATES PATENTS

| | | | |
|---|---|---|---|
| 2,932,558 | 4/1960 | Bennet | 23—253 PC |
| 3,240,554 | 3/1966 | Angerhofer | 423—248 |
| 3,638,397 | 2/1972 | Charlton | 55—158 |

OSCAR R. VERTIZ, Primary Examiner

E. T. WHEELOCK, Assistant Examiner

U.S. Cl. X.R.

23—253 PC, 254 R